June 9, 1959  H. SONNBERGER  2,889,630
TELEMETER

Filed March 31, 1958　　　　　　　　　　　　　　4 Sheets-Sheet 1

June 9, 1959    H. SONNBERGER    2,889,630
TELEMETER

Filed March 31, 1958    4 Sheets-Sheet 2

June 9, 1959  H. SONNBERGER  2,889,630
TELEMETER
Filed March 31, 1958  4 Sheets-Sheet 3
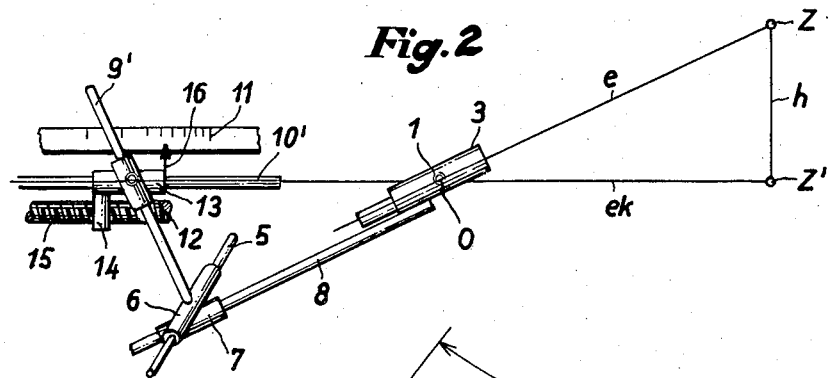
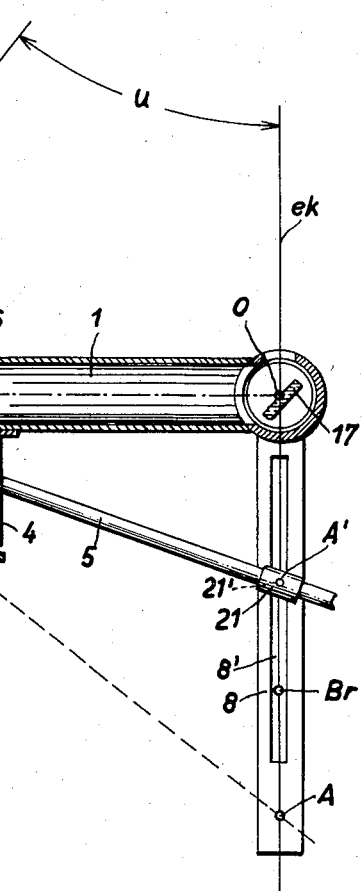

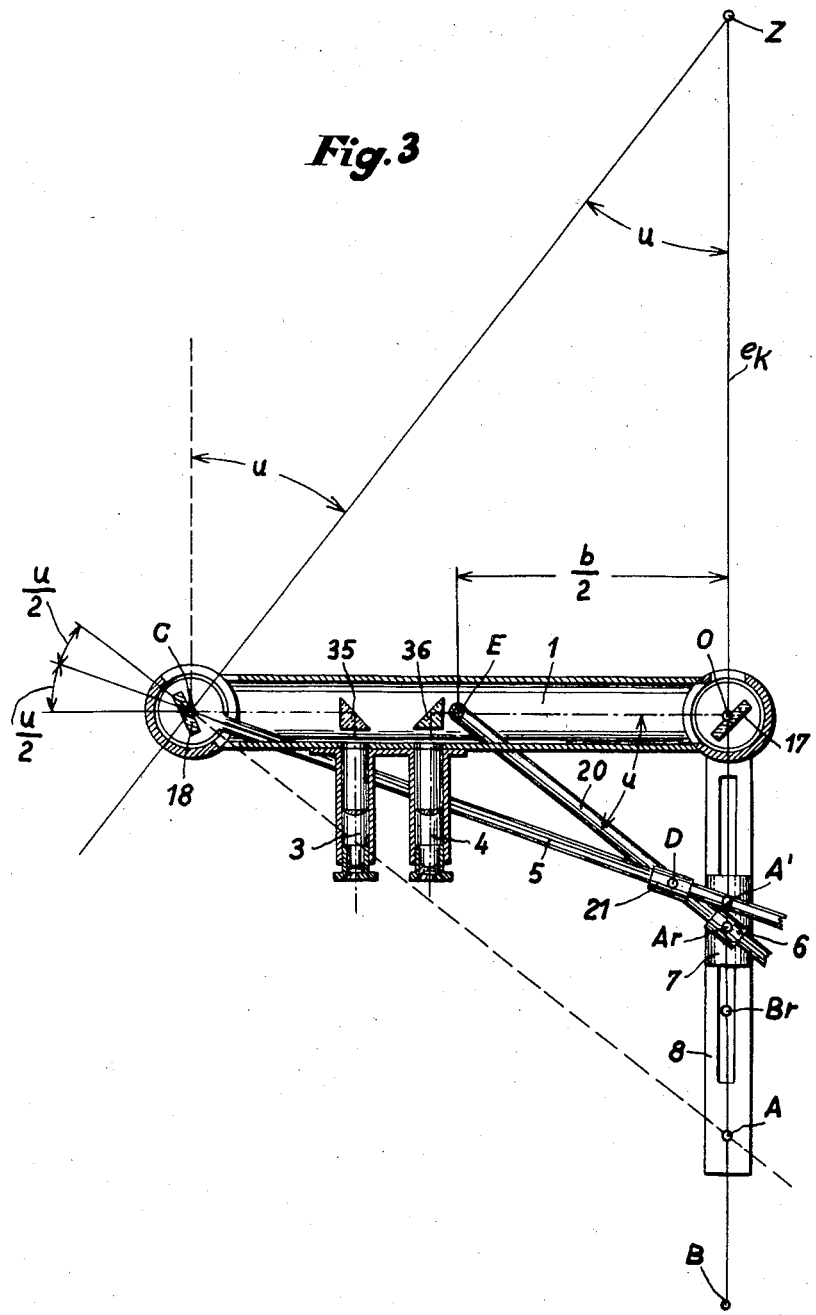

United States Patent Office 2,889,630
Patented June 9, 1959

2,889,630

TELEMETER

Heinrich Sonnberger, Heidenheim (Brenz), Germany, assignor to Carl Zeiss, Heidenheim (Brenz), Wurttemberg, Germany Application March 31, 1958, Serial No. 725,446

Claims priority, application Germany May 9, 1953

7 Claims. (Cl. 33—66)

This application is a continuation-in-part to my application Serial No. 425,597 filed April 26, 1954.

This invention concerns a telemeter with a base of constant length at the point of measurement, which uses one traversable sighting device and one sighting device fixed at right angles to the base. With instruments of this kind, the distance can be calculated from the known magnitude of the angles to the target and the length of the base. Such instruments, however, only register the true distance. If it is desired to find the horizontal or map distance, then the true distance must be recomputed to allow for the height of the target above the horizontal plane.

The instrument of the invention eliminates this drawback by permitting the map distance to be directly read from a scale. This is attained by means of a rod set at right angles to the line of sight of the traversable sighting device in the plane of the target, and connected with a member slidable parallel to the line of sight of the fixed sighting device, this member having a pointer perpendicular to this member and which registers the map distance on a horizontally positioned scale.

The slidable member is to advantage composed of two guide bodies rotatable relative to each other, and of which one is slidable parallel to the line of sight of the fixed sighting device, while the other is slidable along the rod disposed on the traversable sighting device. As a further detail of the object of the invention, the pointer forms a track for a guide body slidable on it, while this guide body is rotatably connected with a second guide body sliding on a track of the scale. In this design, a screw motion can be made to act upon at least one of these guide bodies in the direction of the scale, and thereby retroactively to bring about the setting of the traversable sighting device.

As a way of attaining observation of the target in sighting through a common ocular, it is a well known expedient to provide mirror systems in the path of rays of the sighting devices for example telescopes, so that the sighting rays are deflected in the direction of the base, whence they are introduced into the oculars of said telescopes. In this design of the instrument of the invention, the rotation of the traversable mirror system is used for governing the displacement of the member which is slidable parallel to the line of sight of the fixed sighting device of the mirror system. If the line of sight of the traversable sighting device must be deflected from a direction perpendicular to the base into the direction to the target by an angle $u$, then the mirror system if provided, is turned only by an angle $u/2$. The horizontal reading scale must therefore be numbered accordingly.

As will be seen from the description of the examples shown it is however of advantage, in order to read the map distance with the highest possible accuracy, to convert the rotation of the mirror system by angle $u/2$ into a linear displacement of the slidable member by tan $u$. This is accomplished by having the rod attached to the mirror system act upon a lever connected at a point of the base and which effects the displacement of the slidable member, its point of action on the lever being at the same distance from the lever fulcrum as the mirror system.

In the accompanying drawing, examples of the design principles of the invention are represented:

Fig. 1a shows the operation of finding the distance with an instrument of the invention in a side view along the line I—I of Fig. 1c; Fig. 1b shows the instrument of Fig. 1a viewed from above; Fig. 1c shows the instrument of Fig. 1a in a front view; Fig. 1d is a section along the line II—II of Fig. 1b.

Fig. 2 is an elevation of an instrument similar to that in Figs. 1a to 1d, but wherein a screw motion is provided for swinging the sighting device.

Fig. 3 is a plan view of an instrument similar to that in Figs. 1a to 1d, but with the sighting devices having mirror systems.

Fig. 4 is an altered embodiment of the invention according to Fig. 3.

Figure 1A:
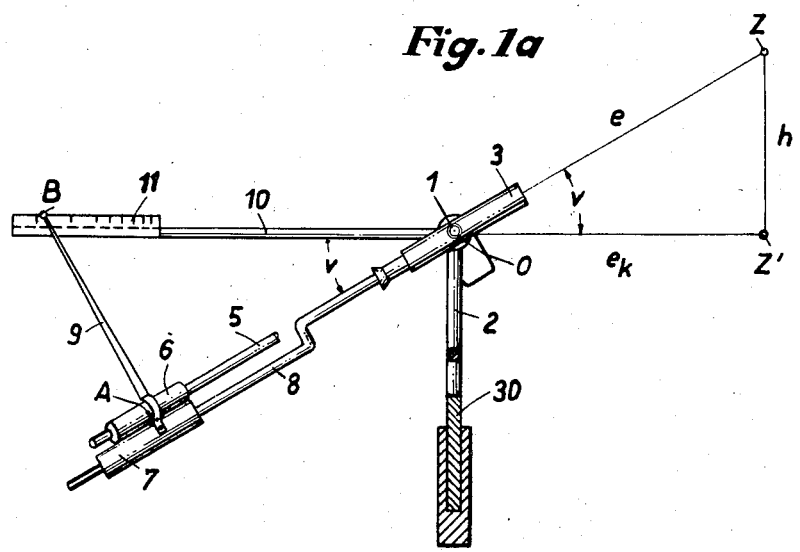
Figure 1D:
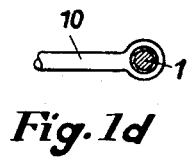
Figure 1B:
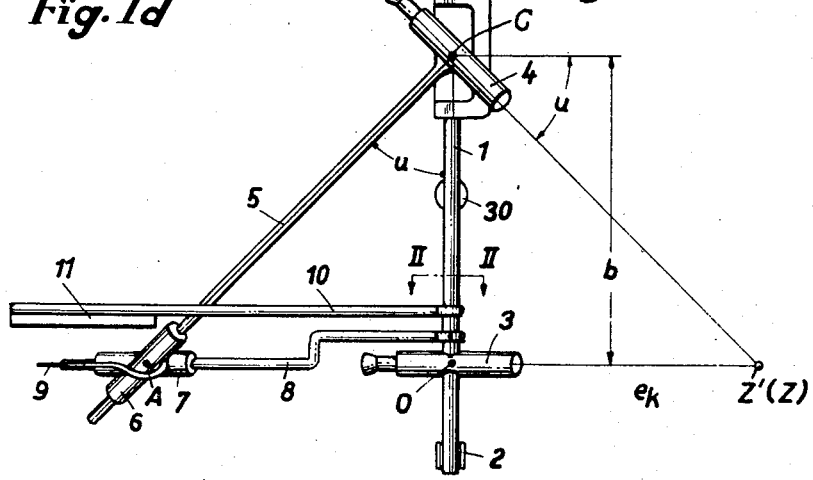
Figure 1C:
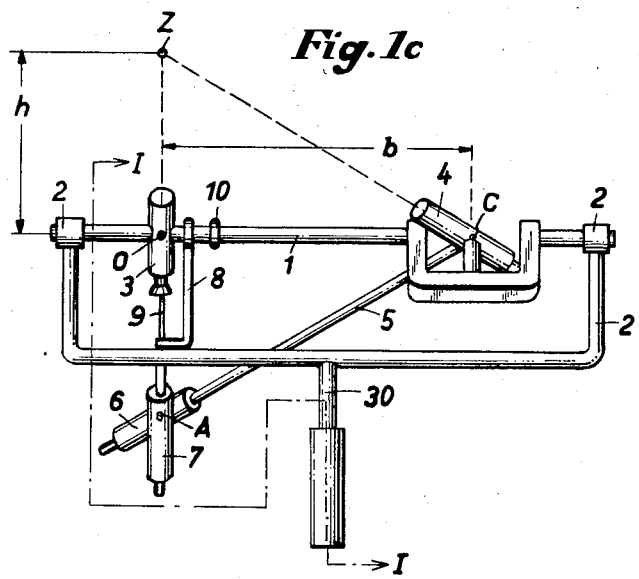

Figs. 1a–1c show a horizontal base 1 of a length $b$ and rotatable around its axis in forks 2, the forks 2 being rotatable around a common axis 30 perpendicular to base 1. Base 1 and forks 2 are turned so that a telescope 3 set at right angles to base 1 points to a target Z. The axes of base 1 and telescope 3 intersect in a point O. The distance of point O from target Z is equal to $e$, which is the true distance. Spaced apart by a length $b$ from point O of base 1 at a point C, and rotatable in the plane of telescope 3 and base 1 with respect to base 1 is a telescope 4. Perpendicular to its line of sight CZ and located parallel to the sighting plane OCZ on telescope 4 is attached a rod 5 which is slidable in a sleeve 6. Sleeve 6 is rotatably connected with a sleeve 7, which in turn is slidable on a rod 8 in direction OZ. At the sleeve 7 a pointer 9 is disposed along the pivotal connection of sleeves 6 and 7 so that its axis intersects the prolongation of ZO and the perpendicular to CZ in point A and so that it stands perpendicular to sighting plane ACZ.

In direction OZ', Z' meaning the projection of point Z in the horizontal plane through the points C and O, a scale 11 is provided fixedly connected with a rod 10. Rod 10 is loosely connected with base 1 so that it can be maintained always horizontal, in which position it is maintained by means not shown. Pointer 9 registers on a point B of scale 11. The scale value of point B is the map distance.

The mode of action of this arrangement is as follows:

Telescope 3 is directed on target Z, and in this operation turns by an angle $v$ from its horizontal position. Simultaneously, rod 8 turns around point O by the same angle $v$, so that the rod 8 and scale 11 likewise include an angle $v$ between them. Now, telescope 4 is swung by an angle $u$ from its perpendicular direction to base 1, into the direction of target Z. In this movement, the rod 5 attached at right angles to telescope 4 turns around the same angle, i.e. it likewise includes an angle $u$ with base 1. Denoting by $h$ the elevation of target Z above point Z', then $OZ'=e_k$, the sought map distance. A, C, and Z are the corner points of a right-angled triangle in which AZ is the hypotenuse. $OC=b$ is the height of this triangle, and accordingly:

(1) $$AO \cdot e = b^2$$

Further:

(2) $$BO \cdot (\cos v) = AO$$

in right-angled triangle BAO, so that Equation 1 transforms into $$BO \cdot (\cos v) \cdot e = b^2$$

or (3) $\qquad BO = b^2/(e \cdot \cos v)$

In right-angled triangle OZ'Z, $\cos v = e_k/e$, so that there follows from Equation 3:

(4) $\qquad BO = b^2/e_k$ where $b^2$, being the square of the base length, is constant. Hence, stretch BO is inversely proportional to map distance $e_k$. Accordingly, the $e_k$ values can be transferred to scale 11 and there directly read as the map distance.

In the example of Fig. 2, pointer 9 is in the form of a rod 9' slidable in a sleeve 12. Sleeve 12 is rotatably connected with a sleeve 13 slidable on a rod 10' connecting scale 11 and base 1 in the same manner as rod 10 in Fig. 1d. Sleeve 13 has a tongue 14 with a tapped hole in which engages a screw 15. By turning this screw, telescope 4 can be moved by way of rods 9' and 5. Also attached to sleeve 13 is a pointer 16 which registers the map distance $e_k$ on scale 11.

Figure 3A:
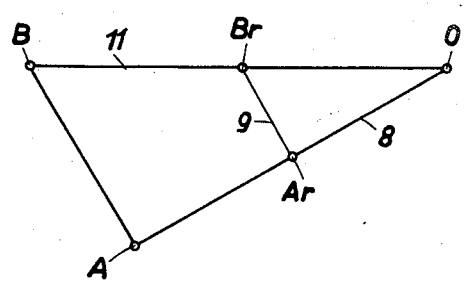
Fig. 3a is a schematic side view of Fig. 3.

In Fig. 3 in front of the telescopes 3 and 4 prisms 35 and 36 as well as mirrors 17 and 18 are arranged deflecting the light rays so that the telescopes 3 and 4 may lie side by side for a binocular observation. Telescopes 3 and 4 as well as mirror 17 are fixedly connected to base 1, while mirror 18 is turnable relative to base 1 by rod 5 which is fixed at 45° to the normal to the mirror. The light rays ZC and ZO falling upon the mirrors 18 and 17 are deflected by these mirrors into the direction of the base axis into the prisms 36 and 35 and the telescopes 4 and 3. When the line of sight CZ is turned by angle $u$ from a position perpendicular to the base, mirror 18 and rod 5 turned by angle $u/2$.

This rotational movement is communicated to a rod 20 jointed at point E to base 1, rod 5 sliding in a sleeve 21 rotatable around point D of rod 20 and transmitting its rotation to rod 20. The points E and D are so located that stretch $DE = EC = b/2$. The prolongation of rod 20 shifts at point $A_r$ the sleeves 6 and 7 on rod 8 as above described.

The mode of action of this arrangement is as follows: Whenever rod 5 with mirror 18 is turned by angle $u/2$, rod 20 turns by angle $u$ because angle DEO is the external angle in isosceles triangle DEC. Point $A_r$ therefore assumes a distance from point O of (5) $\qquad A_rO = (\tan u) \cdot b/2$ Since, moreover, $\tan u = AO/b$ in right angled triangle AOC, Equation 5 transforms into (5') $\quad A_rO = AO/2$, and since $A_rO : B_rO :: AO : BO$, $B_rO = BO/2$, so that (6) $\qquad B_rO = b^2/2e_k$ $B_r$ is the point in the reflection device corresponding to point B in the species of Fig. 1. $B_rO$ differs from BO only by the factor 1/2, something which is important only for the scale ratio. Where in the rotational movement, small angles $u$ only are concerned, use may be made of the relation (7) $\qquad \tan (u/2) = (1/2) \cdot \tan u$, or (8) $\qquad A'O/b = (1/2) \cdot A_rO/(b/2)$ i.e. points $A_r$ and $A'$ are close enough to each other that in this case a scale as per Equation 6 can be employed, while the turning movement of mirror 18 can be directly transmitted through rod 5 to point $A'$. The accuracy of the map distance $e_k$ is obtained within the range of validity of Equation 7.

Fig. 4 shows an embodiment altered to utilize this approximation. Lever 20 of Fig. 3 is missing. Sleeve 21 engages by means of a pin 21' a guide 8' in rod 8. So points $A'$ and D of Fig. 3 fall together. At point $A'$ of sleeve 21 pointer 9 is located. In turning mirror 18 lever 5 shifts sleeve 21 along the guide 8' and pointer 9 moves along scale 11.

The selection of the points of action O of rod 8 and scale 11, as also that of E of rod 20 on base 1 are entirely arbitrary. In other words, base 1 can be prolonged beyond O and the telescope 3 attached at the new terminal point. In this case, proportional changes of length in the magnitudes referred to in Equations 1 to 3 take place, which, however, are of influence upon the scale ratio only.

I claim:

1. Telemeter comprising a base at right angles to a vertical axis, said base being turnable around said vertical axis and around its own axis, and having one traversable sighting device and one sighting device fixed at right angles to its axis to fix a target, said sighting devices having lines of sight lying in a common plane with the axis of said base, a rod disposed parallel to said common plane and being connected with said traversable sighting device at right angles so as to turn with said device, a member arranged slidable parallel to the line of sight of said fixed sighting device and being connected with said rod so as to move parallel to said line of sight in turning said turnable sighting device, a pointer fixed so as to be perpendicular to said common plane on said slidable member, and a scale fixed in a horizontal plane, said pointer registering the map distance on said scale.

2. Telemeter as in claim 1, characterized in that the said slidable member consists of two guide bodies rotatable relative to each other, of which one is slidable on a guide parallel to the line of sight of the said fixed sighting device, while the other is slidable along the said rod turnable with the said traversable sighting device.

3. Telemeter as in claim 1, further comprising two guide bodies and characterized in that the said pointer forms a track for one of said guide bodies slidable on it, and that this body is rotatably connected with the other of said guide bodies, the last named guide body being slidable along a track on the said scale.

4. Telemeter as in claim 1, further comprising two guide bodies and characterized in that the said pointer forms a track for one of said guide bodies slidable on it, and that this body is rotatably connected with the other of said guide bodies, the last named guide body being slidable along a track on the said scale, further comprising a screw adjustment mechanism acting upon at least one of the said guide bodies to shift said body in the direction of the said scale, so as to turn by means of said rods the turnable sighting device.

5. Telemeter comprising a base at right angles to a vertical axis, said base being turnable around said vertical axis and around its own axis and having one fixed sighting device to fix a target, a telescope and a turnable mirror system to deflect the rays coming from the target into the base direction and to said telescope, said fixed sighting device and said turnable mirror system being arranged so as to have lines of sight in a common plane with the axis of said base, a rod fixedly connected with said turnable mirror system, a lever jointed at a point to the base and connected with said rod fixed to said turnable mirror system by a member turnably connected with said lever at a fixed point on said lever and slidable along said rod, said member having the same distance from the lever fulcrum as the turnable mirror system, a further member arranged slidable parallel to the line of sight of said fixed sighting device and being connected with said lever so as to move parallel to said line of sight while turning said turnable mirror system, a pointer fixed so as to be perpendicular to said common plane on said further slidable member, a scale fixed in a horizontal plane, said pointer registering the map distance on said scale.

6. Telemeter as in claim 5, characterized in that said fixed sighting device consists of a telescope and a mirror system, deflecting the rays coming from the target in the base direction and to said telescope.

7. Telemeter comprising a base at right angles to a vertical axis, said base being turnable around said vertical axis and around its own axis and having one fixed sighting device to fix a target, a telescope and a turnable mirror system to deflect the rays coming from the target into the base direction and to said telescope, said fixed sighting device and said turnable mirror system being arranged so as to have lines of sight in a common plane with the axis of said base, a rod fixedly connected with said turnable mirror system, a member slidable along said rod, a further member arranged slidable parallel to the line of sight of said fixed sighting device and being connected with said member slidable along said rod so as to move parallel to said line of sight while turning said turnable mirror system, a pointer fixed so as to be perpendicular to said common plane on said further slidable member, a scale fixed in a horizontal plane, said pointer registering the map distance on said scale.

References Cited in the file of this patent

FOREIGN PATENTS 20,919   Germany _____ Feb. 17, 1883